(12) United States Patent
Cassell

(10) Patent No.: US 8,992,335 B2
(45) Date of Patent: Mar. 31, 2015

(54) CONSTANT VELOCITY JOINT TORSIONAL DAMPER

(75) Inventor: Robert L. Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 46 days.

(21) Appl. No.: 13/503,060

(22) PCT Filed: Oct. 20, 2009

(86) PCT No.: PCT/US2009/061266
§ 371 (c)(1),
(2), (4) Date: Apr. 20, 2012

(87) PCT Pub. No.: WO2011/049554
PCT Pub. Date: Apr. 28, 2011

(65) Prior Publication Data
US 2012/0202605 A1 Aug. 9, 2012

(51) Int. Cl.
*F16D 3/68* (2006.01)
*F16D 3/223* (2011.01)
*F16F 15/124* (2006.01)

(52) U.S. Cl.
CPC ...... *F16D 3/223* (2013.01); *F16D 2003/22326* (2013.01); *F16D 2300/22* (2013.01); *F16F 15/1245* (2013.01); *F16D 3/68* (2013.01); *Y10S 464/906* (2013.01)
USPC .............. 464/89; 464/145; 464/906

(58) Field of Classification Search
USPC ........... 464/73, 74, 75, 76, 82, 83, 85, 87, 88, 464/89, 92, 93, 11, 139, 140, 141, 142, 143, 464/144, 145, 146, 904, 905, 906
See application file for complete search history.

(56) References Cited

U.S. PATENT DOCUMENTS

| | | | |
|---|---|---|---|
| 1,868,163 A | 7/1932 | Evans | |
| 3,924,419 A * | 12/1975 | Barth | ............................... 464/73 |
| 4,582,502 A | 4/1986 | Girguis | |
| 5,468,188 A | 11/1995 | Day | |
| 6,251,021 B1 | 6/2001 | Jacob | |
| 6,846,240 B2 * | 1/2005 | Andra | ............................ 464/83 |

(Continued)

FOREIGN PATENT DOCUMENTS

| | | |
|---|---|---|
| CN | 2314144 | 4/1999 |
| DE | 2421690 A1 | 11/1975 |
| DE | 3343794 A1 | 6/1985 |

(Continued)

OTHER PUBLICATIONS

English Translation of DE 3504670, Sep. 13, 2013.*

(Continued)

*Primary Examiner* — Greg Binda
*Assistant Examiner* — Matthieu Setliff
(74) *Attorney, Agent, or Firm* — Jennifer M. Brumbaugh; Reising Ethington P.C.

(57) ABSTRACT

A constant velocity joint including an outer race having inner and outer surfaces, the inner surface including a plurality of outer ball tracks. The constant velocity joint also includes an inner race having a plurality of inner ball tracks which correspond to the outer ball tracks, a ball cage disposed between the outer race and the inner race, a plurality of balls arranged within the ball cage and contacting the outer ball tracks and the inner ball tracks. A damping assembly is connected to the outer race.

17 Claims, 7 Drawing Sheets

(56) References Cited

U.S. PATENT DOCUMENTS

| | | |
|---|---|---|
| 7,022,023 B2 | 4/2006 | Guo et al. |
| 2008/0171603 A1 | 7/2008 | Kneeshaw et al. |

FOREIGN PATENT DOCUMENTS

| | | | |
|---|---|---|---|
| DE | 3504670 A1 * | 8/1985 | ............... 464/87 |
| GB | 1190977 | 5/1970 | |
| JP | 1-115021 | 8/1989 | |
| JP | 5-25029 | 4/1993 | |
| JP | 11-269309 | 10/1999 | |
| JP | 2009047224 A | 3/2009 | |
| SU | 836411 A1 * | 6/1981 | ............... 464/76 |
| WO | WO2007102996 A2 | 9/2007 | |

OTHER PUBLICATIONS

JP Office Action for JP Application No. 2012-535176 dated Jul. 23, 2013 (2 pages).

EP Extended Search Report for EP Application No. 09850656.1 dated Oct. 7, 2013, (9 pages).

CN Office Action for CN Application No. 200980162076.1 dated Mar. 5, 2014 (11 pages).

* cited by examiner

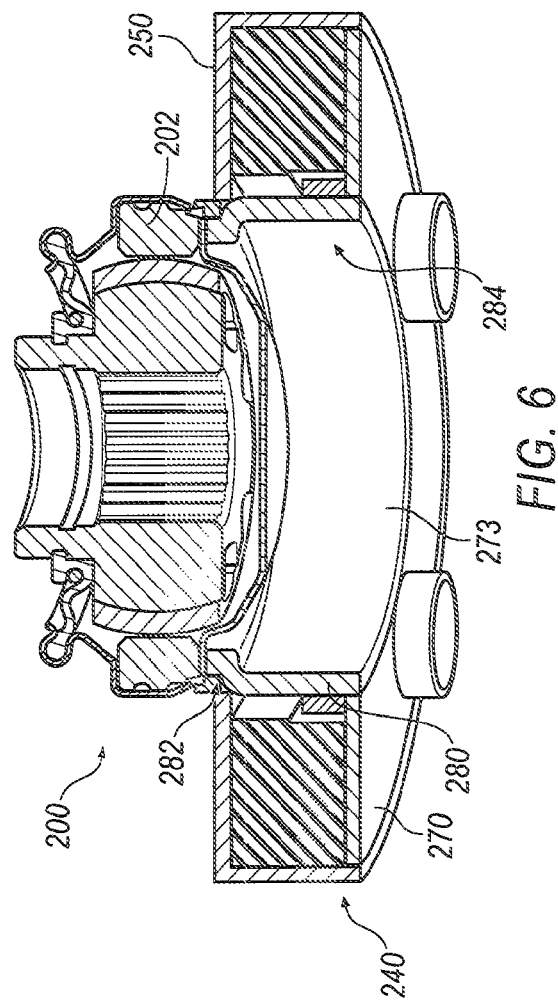
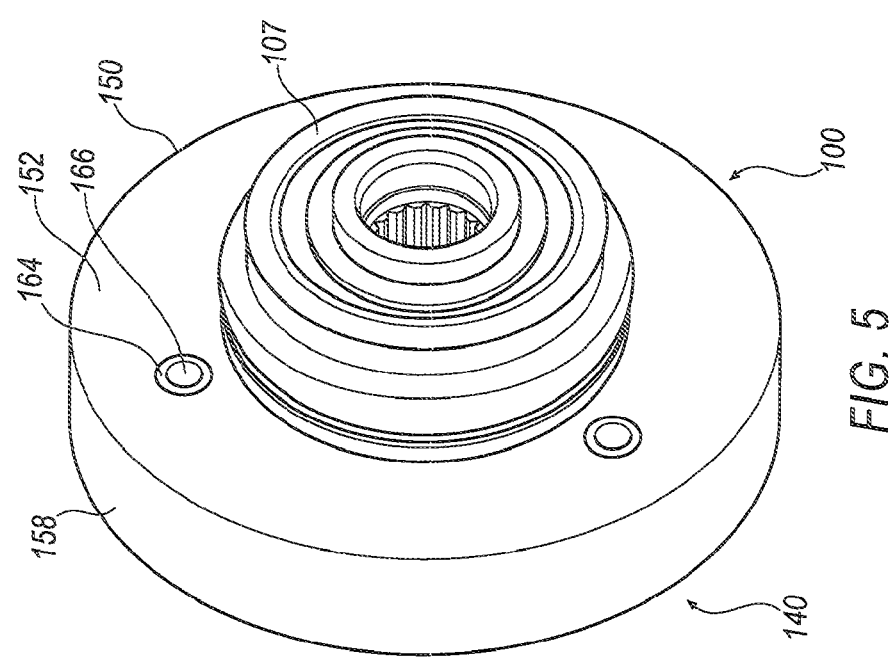
FIG. 6
FIG. 5

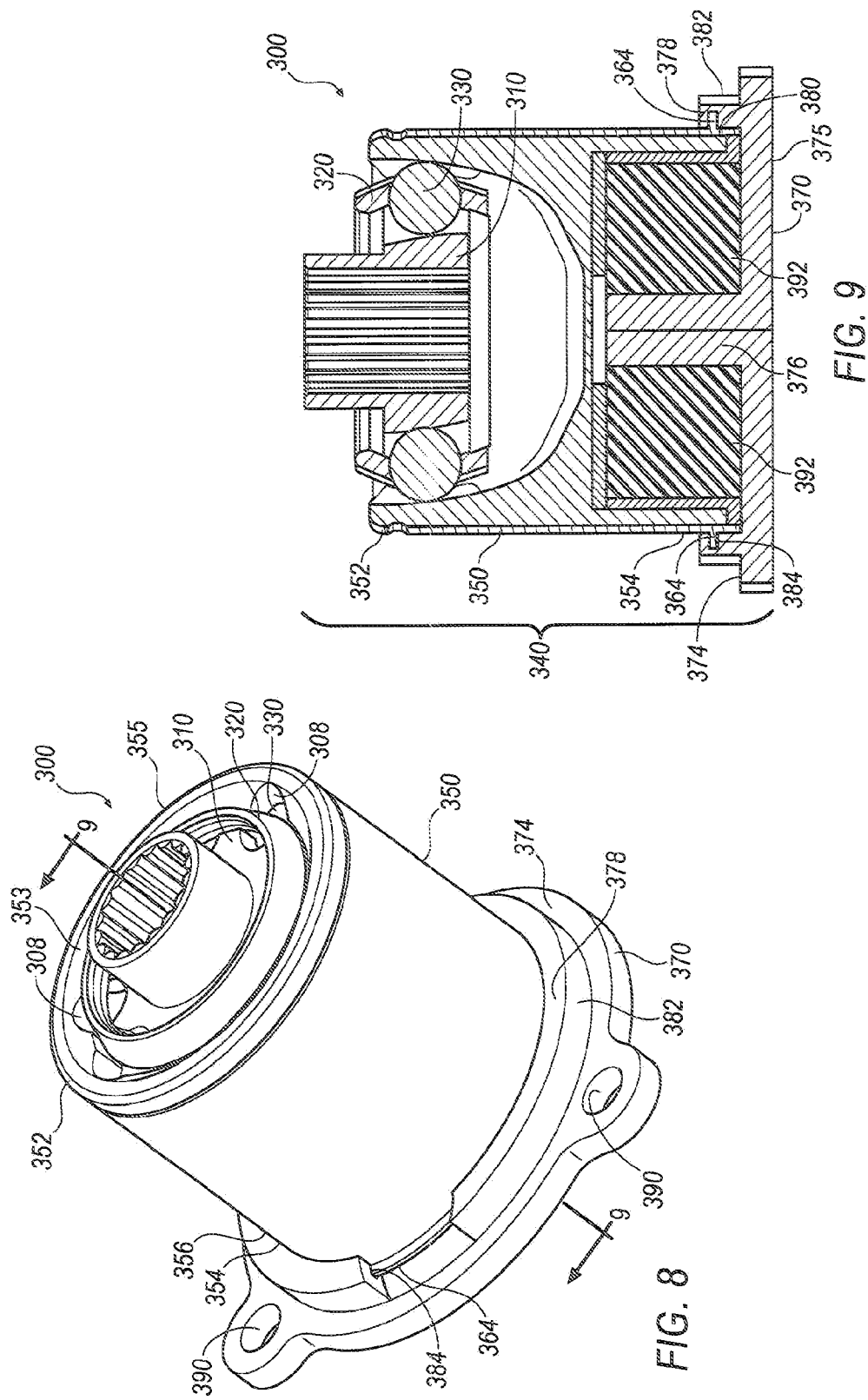

CONSTANT VELOCITY JOINT TORSIONAL DAMPER

TECHNICAL FIELD

The present disclosure relates to a torsional damping assembly for a constant velocity joint.

BACKGROUND ART

In a power transmission system, the torques generated by the rotating parts may not be smooth, or the component being driven may not react to the torque smoothly. Further, the components transmitting the torque may generate non-smooth or alternating torques. This results in a torsional resonance which is transmitted throughout the system. Such torsional resonance can result in undesirable conditions, such as driveline rattle, noise, vibration and harshness, among others.

Thus, there exists a need for a torsional damper which can absorb such torsional resonance transmitted throughout the system, and reduce the amount of driveline rattle, noise, vibration and harshness experienced by the system.

BRIEF DESCRIPTION OF DRAWINGS

FIG. 5 is a perspective view of the assembled constant velocity joint of FIG. 2.

FIG. 6 is a cross-sectional view of an alternative illustration of the constant velocity joint of FIG. 2.

FIG. 8 is a perspective view of the assembled constant velocity joint of FIG. 7.

FIG. 9 is a partial cross-sectional view of Section 9-9 of FIG. 8.

DETAILED DESCRIPTION

Exemplary illustrations are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Figure 1:
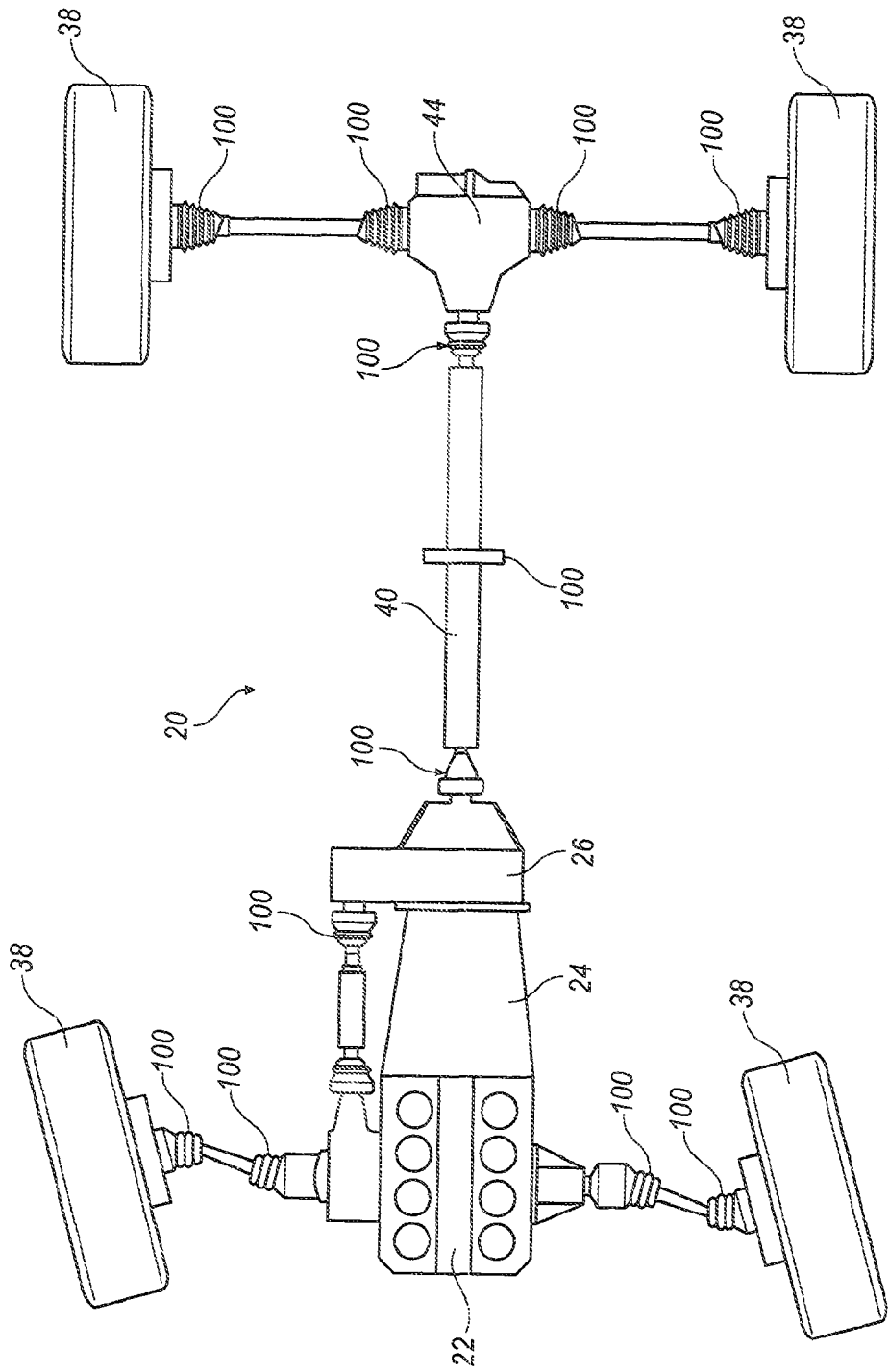
FIG. 1 is a schematic view of an exemplary vehicle driveline system.

FIG. 1 illustrates a driveline 20 of a vehicle (not shown). The driveline 20 includes an engine 22 that is connected to a transmission 24 and a transfer case, or power take off unit, 26. The power take off unit 26 has a propeller shaft assembly 40 extending therefrom to connect the power take off unit 26 to a rear differential 44.

The driveline 20 includes multiple constant velocity joints 100. The constant velocity joints 100 transmit torque to wheels 38 even if the wheels 38 or propeller shaft assembly 40 have changing angles due to steering, driveline windup, and suspension jounce and rebound.

The constant velocity joints 100 may be of any of the standard types known, such as plunging tripod, cross groove joint, fixed ball joint, fixed tripod joint, or double offset joints, all of which are commonly known terms in the art for different varieties of constant velocity joints. The constant velocity joints 100 allow for transmission of constant velocities at angles which are found in everyday driving of automotive vehicles in both the half shafts and prop shafts of these vehicles.

The driveline 20 represents an all wheel drive vehicle, however it should be noted that the embodiment of the constant velocity joints 100 of the current disclosure can also be used in rear wheel drive vehicles, front wheel drive vehicles, all wheel drive vehicles and four wheel drive vehicles.

Figure 2:
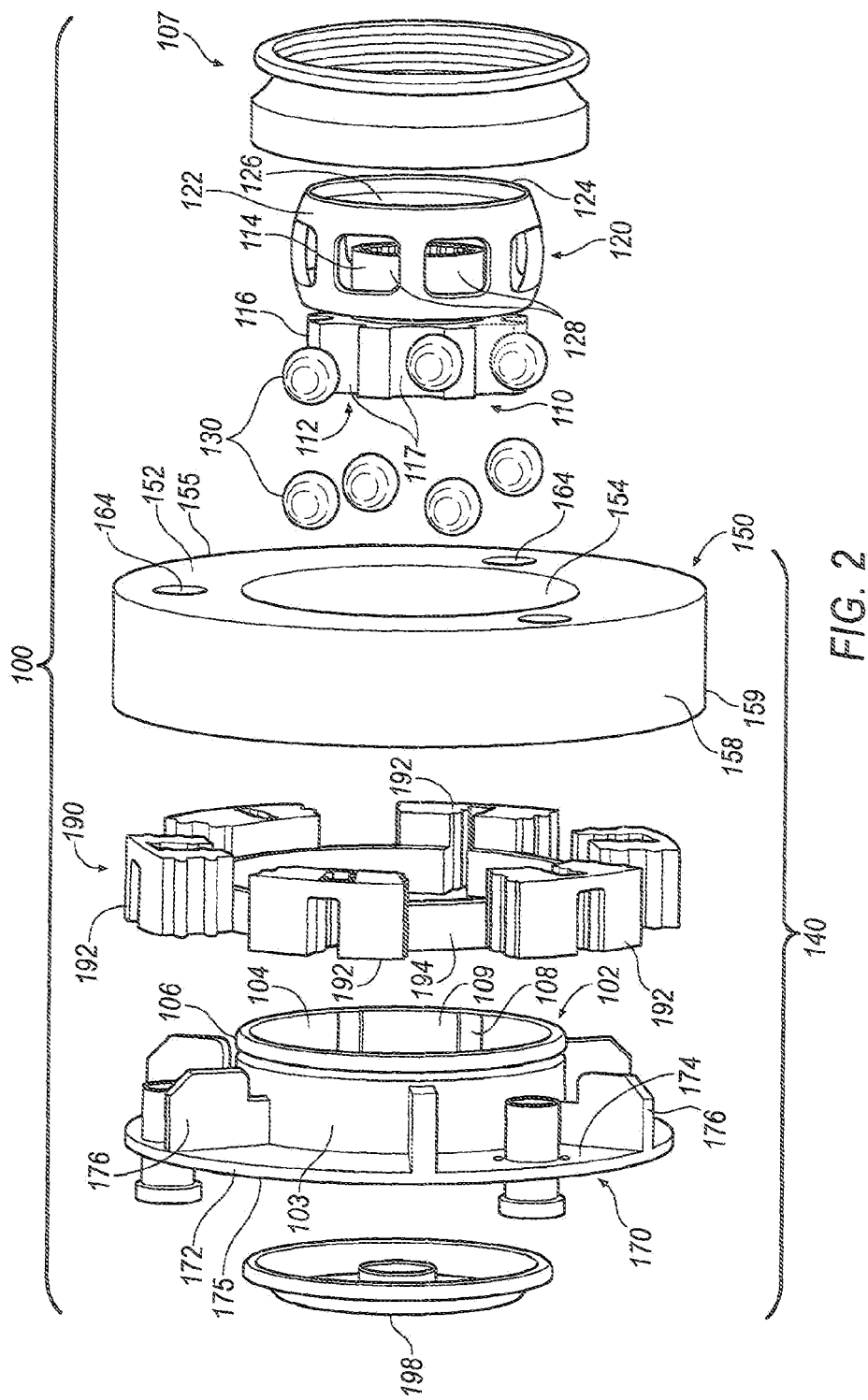
FIG. 2 is an exploded perspective view of a constant velocity joint illustrated in FIG. 1.

As seen in FIG. 2, constant velocity joint 100 includes an outer race 102 (connected to an inner drive element, to be described below), an inner race 110, a ball cage 120, a plurality of balls 130, and a damping assembly 140 (to be described in greater detail below). Outer race 102 is configured as a generally cylindrical hollow ring and includes a generally circumferentially shaped bore 104 therethrough. Bore 104 is configured to receive ball cage 120 and inner race 110. At least one circumferential channel 106 is provided about the entire outer periphery of an outer surface 103 of outer race 102. Circumferential channel 106 allows for selective attachment of a boot cover 107 to outer race 102. Outer race 102 further includes a plurality of outer ball tracks 108 located on an inner surface 109 of outer race 102. Outer race 102 may be generally made of a steel material, as outer race 102 must be able to withstand the high speeds, temperatures and contact pressures of the constant velocity joint 100. Other suitable materials may be used for outer race 102, such as other metals, hard ceramics, plastics or composite materials.

Inner race 110 is configured as a generally annular ring having a solid cross-section. Inner race 110 may include an inner bore 112 having a plurality of splines on an inner surface of inner bore 112. Inner race 110 may also include a stub shaft 114 having a plurality of splines on either the inner surface or the outer surface of stub shaft 114. Stub shaft 114 or inner bore 112 can be used to connect inner race 110 to the propshaft of driveline 20. The outer surface 116 of inner race 110 includes a plurality of inner ball tracks 117, which correspond to outer ball tracks 108 of outer race 102.

A ball cage 120 is also included in constant velocity joint 100. Ball cage 120 is configured as a generally annular hollow ring including an outer surface 122, an inner surface 124, and an aperture 126 therethrough for receiving inner race 110. Ball cage 120 also includes a plurality of orifices 128 through the outer surface 122 and inner surface 124 of ball cage 120. The number of orifices 128 corresponds to the number of outer ball tracks 108 and inner ball tracks 117. A plurality of balls 130 are arranged such that each ball 130 rests within one of the orifices 128 of ball cage 120, within one of the outer ball tracks 108, and within one of the inner ball tracks 117.

Figure 3:
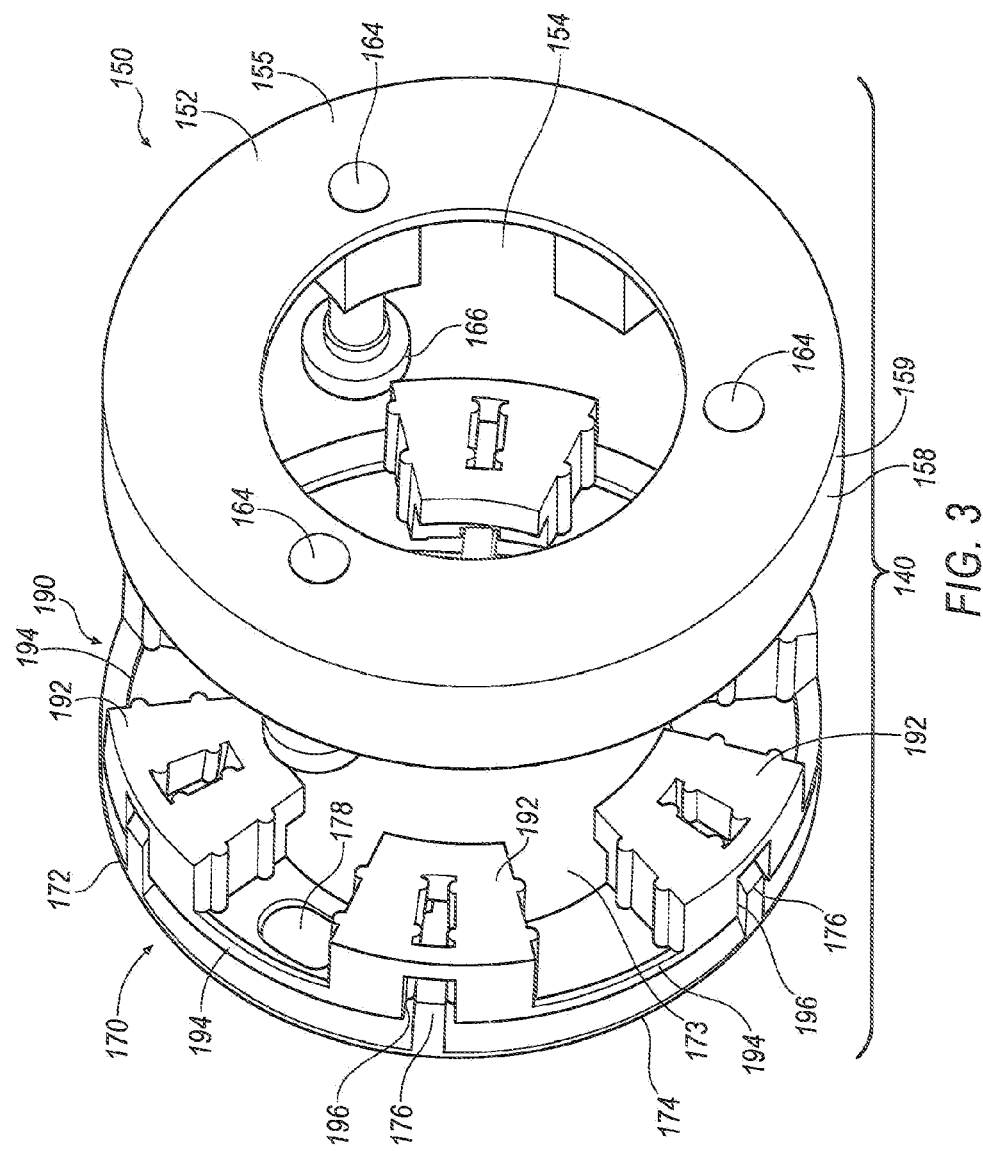
FIG. 3 is an exploded perspective view of the damping assembly of FIG. 2.
Figure 4:
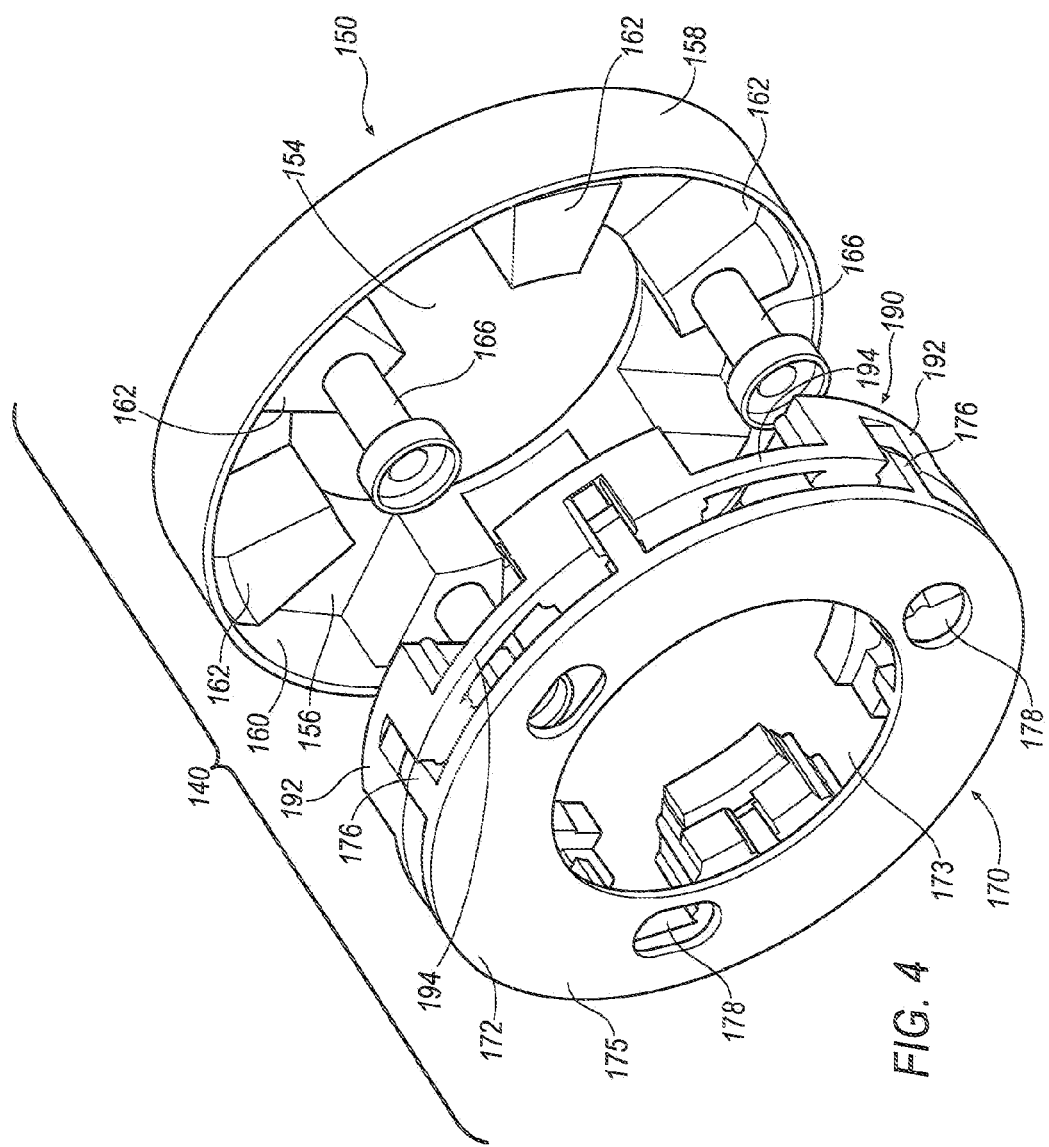
FIG. 4 is a further exploded perspective view of the damping assembly of FIG. 2.

In one illustration, as seen in FIGS. 2-4, damping assembly 140 includes an outer drive element 150, an inner drive element 170, and a damping member 190. Outer drive element 150 is configured as a generally annular ring, and includes a top portion 152 having an aperture 154 formed therethrough for receiving outer race 102. Top portion 152 includes a top surface 155 and a bottom surface 156 (best seen in FIG. 4), and a generally annular wall 158 defined by an outer wall surface 159 and an inner wall surface 160 extending from top portion 152. Disposed on, or integral with, the bottom surface 156 of top portion 152 and the inner wall surface 160 of annular wall 158 are a plurality of spaced apart teeth 162. Top portion 152 includes a plurality of mounting bores 164, each of which pass through the top and bottom surfaces 155, 156 of top portion 152, and one of teeth 162. Mounting bores 164 may pass through some, or all, of teeth 162. Mounting bores 164 are configured to receive mourning elements 166. Outer drive element 150 may be made of metal, although any suitable material can be used.

Inner drive element 170 is configured as a generally annular ring, and includes a bottom portion 172 having an aperture 173 therethrough. Inner drive element 170 may be made of metal. Bottom portion 172 includes a top surface 174 and a bottom surface 175, and a plurality of projections 176 extending from top surface 174. Bottom portion 172 includes a plurality of elongated apertures 178, one for each of the mounting bores 164 of outer drive element 150. Elongated apertures 178 are configured to be wider than mounting bores 164. Inner drive element 170 is connected to outer drive element 150 by mounting elements 166, which pass through elongated apertures 178 and mounting bores 164. Mounting elements 166 are also used to mount constant velocity joint 100 in position in driveline 20, such as to transmission 24 or wheels 38. Outer race 102 is connected to inner drive element 170, such as by welding outer race 102 about aperture 173 to provide a direct line of torque from outer race 102 to inner drive element 170. Inner drive element 170 may be made of metal, although any suitable material can be used.

Damping assembly 140 also includes a damping member 190. As shown in FIGS. 3-4, damping member 190 includes a plurality of damping elements 192 connected together by damping element connectors 194. Damping member 190 is made of a high density rubber material such as natural rubber (latex), or a synthetic rubber, including but not limited to synthetic natural rubber (IR), Hydrogenated Nitrile Butadiene rubber (HNBR), Nitrile rubber (NBR), Polychloroprene (CR), and Silicone rubber (MQ, VMQ, PMQ, FMQ), although any suitable material can be used. The high density rubber material may include filler material to stiffen the high density rubber material or plasticizers to soften the high density rubber material. The high density rubber material may be chosen based upon the operating conditions that damping assembly 140 may experience. Damping member 190 includes at least one damping element 192 to correspond to each of the projections 176 of inner drive element 170. Alternatively, damping member 190 may comprise a plurality of discrete damping elements 192 which are not connected to one another. Damping elements 192 are not limited to the configurations of damping elements 192 illustrated in FIGS. 3-4, as damping elements 192 of any suitable configuration can be used.

As shown in FIG. 3, damping elements 192 include a damping bore 196 therethrough to receive projections 176. Damping member 190 is arranged on inner drive element 170 such that each damping element 192 receives one of the projections 176 of inner drive element 170 through the damping bore 196. When projection 176 is received by damping bore 196 of damping element 192, a portion of damping member 192 rests on either side of projection 176. Alternatively, a damping element 192 may be disposed on either side of each projection 176.

Damping assembly 140 may further include a cap 198 attached to inner drive element 170 to cover aperture 173.

The assembled constant velocity joint 100 is shown in FIG. 5. Outer race 102, which receives inner race 110, balls 130, and ball cage 120, is connected to inner drive element 170. Damping member 190 is mounted on inner drive element 170, and inner drive element 170 and outer drive element 150 are connected together by mounting elements 166. In this manner, outer race 102, inner race 110, balls 130 and ball cage 120 are contained within the damping assembly 140. Also, damping member 190 is integrated into the rear of constant velocity joint 100. This minimizes the profile of constant velocity joint 100.

Mounting elements 166 prevent inner drive element 170 and outer drive element 150 from separating from one another. However, as elongated apertures 178 are wider than mounting bores 164, some relative rotation between inner drive element 170 and outer drive element 150 is permitted. When inner drive element 170 is connected to outer drive element 150, teeth 162 of outer drive element 150 are disposed between adjacent damping elements 192 such that teeth 162 are sandwiched between adjacent damping elements 192.

Torsional resonance created by the operation of driveline 20 is transmitted throughout driveline 20, including through constant velocity joint 100. The torsional resonance created during operation of driveline 20 contributes to the noise, vibration and harshness experienced by the vehicle, and occupants of the vehicle. During operation of driveline 20, inner drive element 170 and outer drive element 150 can experience rotation relative to each other. When relative rotation occurs between inner drive element 170 and outer drive element 150, teeth 162 are forced into contact with damping elements 192, which places damping elements 192 under a compressive load. As damping elements 192 are disposed over both sides of projections 176, teeth 162 will be forced into contact with a damping element 192 regardless of the direction of the relative rotation between inner drive element 170 and outer drive element 150.

When subjected to compressive load by teeth 162, damping elements 192, which are compliant in a torsional direction, deform and absorb some of the torsional resonance transmitted through constant velocity joint 100. Thus, the deformation of the damping elements 192 enables damping of the rotational torque transmitted through driveline 20, which reduces the noise, vibration, harshness and drive line rattle experienced by the vehicle.

FIG. 6 is an alternative illustration of a damping assembly 240 for use with a constant velocity joint 200. Due to space considerations, it may not be practical to directly connect the outer race 202 to the inner drive element 270 within damping assembly 240. In this illustration, outer race 202 is disposed adjacent damping assembly 240. A spacer 280 may be used to connect outer race 202 to inner drive element 270. Spacer 280 is configured as a generally cylindrical hollow tube having a first end 282 and a second end 284. Spacer 280 is connected to inner drive element 270, such as by welding the second end 284 of spacer 280 to the interior portion of inner drive element 270 that forms aperture 273. The first end 282 of spacer 280, which may have a diameter smaller than that of the second end 284 of spacer 280, is connected to outer race 202, such as by welding the first end 282 to outer race 202. The connection of outer race 202 to inner drive element 270 by spacer 280 provides a direct path by which drive torque is transmitted from outer race 202 to inner drive element 270, even though outer race 202 is not directly connected to inner drive element 270 or an outer drive element 250.

Figure 7:
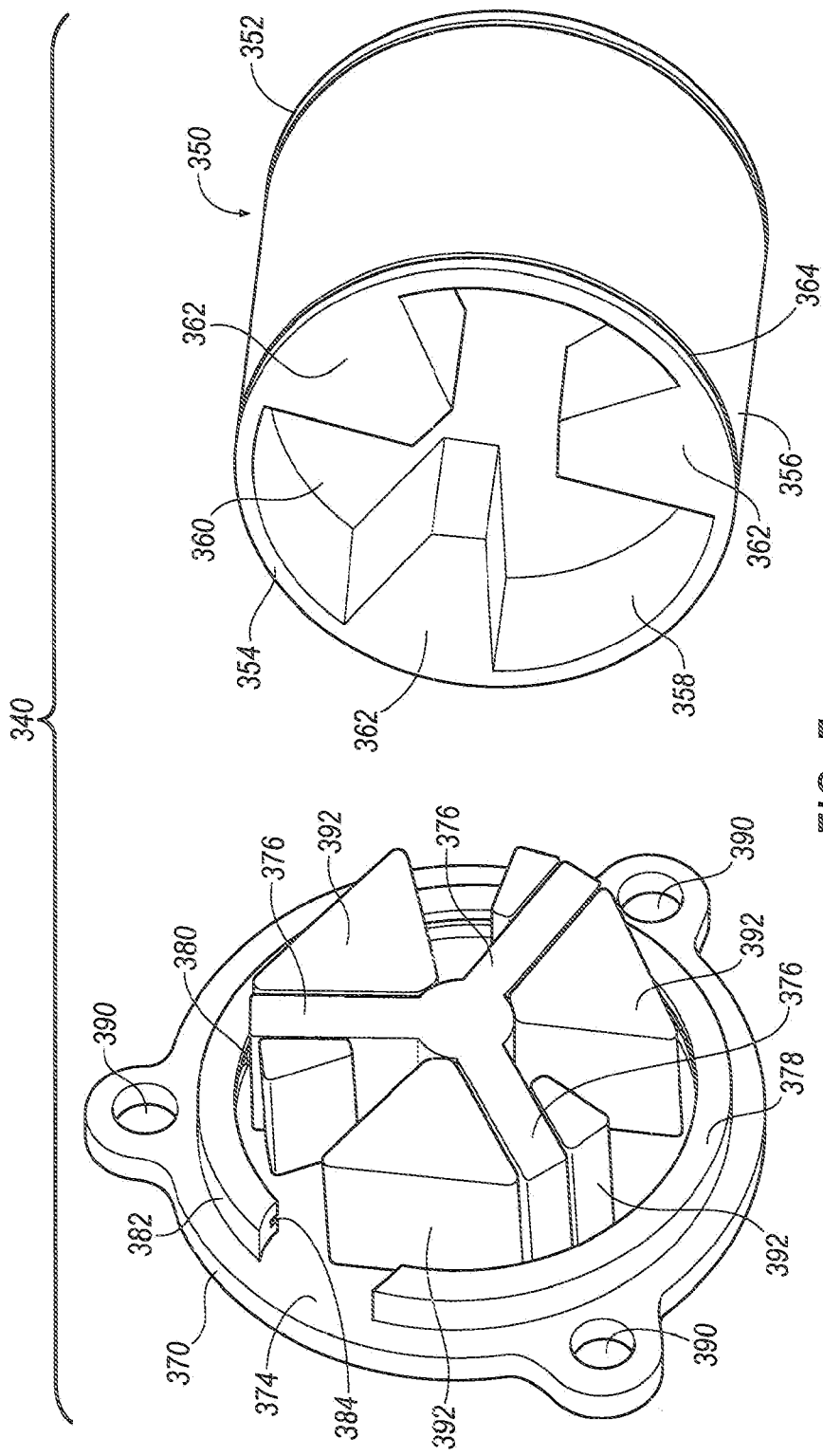
FIG. 7 is an exploded perspective view of another alternative illustration of the constant velocity joint of FIG. 2.

In yet another illustration, as shown in FIGS. 7-9, damping assembly 340 for use with constant velocity joint 300 includes a housing member 350, which functionally replaces the outer drive element and the outer race of previous embodiments in FIGS. 2-6. Housing member 350 is generally cylindrical, having a first end 352 and a second end 354. Outer race 355 is integral with first end 352 of housing member 350, and is configured to receive the inner race 310, the ball cage 320 and balls 330. A plurality of outer ball tracks 308 are located on an inner surface 353 of the first end 352 of housing member 350. The first end 352 also includes a bottom surface 360.

The second end 354 of housing member 350 is generally hollow, and has an outer wall 356, and inner wall 358. Disposed on, or integral with, the bottom surface 360 of the first end 352 and the inner wall 358 of the second end 354 of housing member 350 are a plurality of spaced apart teeth 362. Second end 354 of housing member 350 functions as an outer drive member for constant velocity joint 300. An annular ridge 364 is formed on the outer wall 356 of the second end 354 of housing member 350 and extends circumferentially about the second end 354.

Inner drive element 370 is configured as a generally annular disc, and includes a top surface 374 and a bottom surface 375. Top surface 374 includes a plurality of projections 376 connected to one other proximate the center of the top surface 374 and radiating towards the outer edge of top surface 374. Top surface 374 further includes an annular wall 378 having an inner face 380 and an outer face 382 extending circumferentially about the top surface 374 proximate the outer edge of the top surface 374. Inner face 380 of annular wall 378 includes an annular groove 384. Annular groove 384 is configured to receive annular ridge 364 of the second end 354 of housing member 350. Damping elements 392 are disposed on either side of each projection 376. Inner drive element 370 also includes a plurality of apertures 390 along the outer edge of inner drive element 370. Apertures 390 are configured to receive mounting elements (not shown) such that inner drive element 370 can be mounted within driveline 20.

The assembled constant velocity joint of FIG. 7 is shown in FIGS. 8 and 9. Inner race 310, ball cage 320 and balls 330 are inserted into the first end 352 of housing member 350. Damping elements 392 are disposed about either side of projections 376 of inner drive element 370. Housing member 350 is then mounted to inner drive element 370 by mating annular ridge 364 of housing member 350 with annular groove 384 of inner drive element 370. The mating of annular ridge 364 with annular groove 384 prevents housing member 350 from separating from inner drive element 370, and allows for some relative rotation between housing member 350 and inner drive element 370. When housing member 350 is mounted to inner drive element 370, teeth 362 are disposed between adjacent damping elements 392 Mounting elements (not shown) may be inserted through apertures 390 of inner drive element 370 to mount constant velocity joint 300. Further, one skilled in the out will recognize that there are other techniques for attaching housing member 350 to inner drive element 370 and the use of annular ridge 364 and annular groove 384 is but one illustrative example. Other connection techniques such as the use of clips and the like are also contemplated by the present invention.

During operation of driveline 20, inner drive element 370 and housing member 350 can experience rotation relative to each other. When relative rotation occurs between inner drive element 370 and housing member 350, teeth 362 are forced into contact with adjacent damping elements 392, which places damping elements 392 under a compressive load. When subjected to this compressive load, damping elements 392 deform and absorb some of the torsional resonance transmitted through constant velocity joint 300. Thus, the deformation of the damping elements 392 enables damping of the rotational torque transmitted through driveline 20, which reduces the noise, vibration and harshness and drive line rattle experienced by the vehicle.

Damping elements 392 are made of a high density rubber material such as natural rubber (latex), or a synthetic rubber, including but not limited to synthetic natural rubber (IR), Hydrogenated Nitrile Butadiene rubber (HNBR), Nitrile rubber (NBR), Polychloroprene (CR), and Silicone rubber (MQ, VMQ, PMQ, FMQ), although any suitable material can be used. The high density rubber material may include filler material to stiffen the high density rubber material or plasticizers to soften the high density rubber material. The high density rubber material may be chosen based upon the operating conditions that damping assembly 340 may experience.

Although the above illustrations show use of the damping assembly in a constant velocity joint, such damping assemblies can be used in any type of universal joint.

The present disclosure has been particularly shown and described with reference to the foregoing embodiments, which are merely illustrative of the best modes for carrying out the disclosure. It should be understood by those skilled in the art that various alternatives to the embodiments of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application

What is claimed is:

1. A constant velocity joint comprising:
an outer race having inner and outer surfaces, the inner surface including a plurality of outer ball tracks;
an inner race having a plurality of inner ball tracks which correspond to the outer ball tracks;
a ball cage disposed between the outer race and the inner race;
a plurality of balls arranged within the ball cage and contacting the outer ball tracks and the inner ball tracks; and
a damping assembly connected to the outer race, the damping assembly including an outer drive element, an inner drive element, and a damping member, the outer drive element having a plurality of teeth and a plurality of mounting bores, the inner drive element having a plurality of projections and a plurality of apertures spaced from the projections, in assembly the damping member is disposed between each adjacent tooth and projection, the outer drive element and inner drive element are connected together via mounting elements passing through the mounting bores and the apertures, the outer drive element being configured as a generally annular ring defining an aperture therethrough, the outer drive element having a top portion including a top surface and a bottom surface, the outer drive element having a generally annular wall extending from the top portion, the teeth being disposed on the bottom surface of the top portion, the inner drive element being configured as a generally annular ring defining a central aperture therethrough, the inner drive element having a bottom portion including a top surface and a bottom surface, the projections extending from the top surface of the inner drive element, the inner drive element being connected to the outer race, the damping element being disposed on the top surface of the inner drive element, the damping assembly further including a spacer having a first end and a second end, the first end of the spacer being connected to the outer race and the second end of the spacer being connected to the inner drive element.

2. The constant velocity joint according to claim 1, wherein the damping member is made of a rubber material.

3. The constant velocity joint according to claim 1, wherein the damping member includes a plurality of damping elements.

4. The constant velocity joint according to claim 3, wherein the damping elements are disposed about the projections extending from the inner drive element such that the projections are disposed between the damping elements.

5. The constant velocity joint according to claim 3, wherein the plurality of damping elements are discrete damping elements.

6. The constant velocity joint according to claim 3, wherein the plurality of damping elements are connected together by damping element connectors.

7. The constant velocity joint according to claim 3, wherein the teeth of the outer drive element are disposed between adjacent damping elements.

8. The constant velocity joint according to claim 1, wherein the top portion of the outer drive element includes the mounting bores formed therethrough, and the bottom portion of the inner drive element includes the corresponding apertures, wherein the apertures of the inner drive element are wider than the mounting bores of the outer drive element so that the inner drive element and the outer drive element rotate relative to each other during use of the constant velocity joint.

9. The constant velocity joint according to claim 1, wherein the teeth are unitary extensions of the outer drive element and the projections are unitary extensions of the inner drive element.

10. A damping assembly comprising:
an outer drive element configured as a generally annular ring defining an aperture therethrough, the outer drive element having a top portion including a top surface and a bottom surface, and a generally annular wall extending from the top portion, the outer drive element including a plurality of teeth disposed on the bottom surface of the top portion, the top portion including a plurality of mounting bores formed therethrough;

an inner drive element configured as a generally annular ring defining a central aperture therethrough, the inner drive element having a bottom portion including a top surface and a bottom surface, the inner drive element including a plurality of projections extending from the top surface of the inner drive element, the bottom portion including a plurality of apertures spaced from the projections, the inner drive element connected to the outer drive element via mounting elements passing through the mounting bores and the apertures; and a damping member disposed on the top surface of the inner drive element wherein a constant velocity joint including an outer race is received within the outer drive element aperture and the inner drive element central aperture and is connected to the damping assembly;

wherein the damping assembly further includes a spacer having a first end and a second end, the first end of the spacer connected to the outer race and the second end of the spacer connected to the inner drive element.

11. The damping assembly according to claim 10, wherein the damping member is made of a rubber material.

12. The damping assembly according to claim 10, wherein the damping member includes a plurality of damping elements.

13. The damping assembly according to claim 12, wherein the damping elements are disposed about the projections extending from the inner drive element such that the projections are disposed between the damping elements.

14. The damping assembly according to claim 12, wherein the plurality of damping elements are discrete damping elements.

15. The damping assembly according to claim 12, wherein the plurality of damping elements are connected together by damping element connectors.

16. The damping assembly according to claim 12, wherein the teeth of the outer drive element are disposed between adjacent damping elements.

17. The damping assembly according to claim 10, wherein the apertures have a width greater than the width of the mounting bores.

* * * * *